Patented Aug. 6, 1929.

1,723,188

UNITED STATES PATENT OFFICE.

THEODORE C. MANCHESTER, OF KENT, WASHINGTON.

SUBSTITUTE FOR MOTHERS' MILK.

No Drawing.   Application filed July 3, 1923. Serial No. 649,375.

My invention relates to an improved substitute for mothers' milk derived wholly from cows' milk and in the process of making the same and the object of my invention is to provide a substitute for mothers' milk which embodies the same chemical constituents in approximately the same proportions as are found in mothers' milk.

The average chemical composition of mothers' milk as compared with cows' milk is approximately as follows:

|  | % fat | % protien | % lactose | % ash | % total solids |
|---|---|---|---|---|---|
| Mothers' milk | 3.5 | 1.6 | 6.5 | 0.22 | 11.82 |
| Cows' milk | 3.7 | 3.8 | 4.5 | 0.72 | 12.70 |

From the foregoing it will be obvious that there are certain decided differences between the average composition of the two milks. The largest variation in the main constituents being in the percentage of the protein and lactose. There being about double the percentage of protein in cows' milk than there is in mothers' milk and there being about one third less lactose in cows' milk than there is in mothers' milk.

By removing a portion of the protein from the cows' milk and also removing a portion of the fat and concentrating the portion of the milk then remaining it is possible to obtain a modified milk of approximately same proportions of mothers' milk.

I will illustrate by an example how the proper composition is obtained. Let us start with 100 pounds of cows' milk having the chemical composition as above stated.

The 100 pounds of milk is first pasteurized and cooled. Then I take 85 pounds of said milk and separate the cream from the same which will produce approximately 10 pounds of cream and will leave 75 pounds of skimmed milk. At this stage I have 15 pounds of milk, 10 pounds of cream and 75 pounds of skim milk.

From the 75 pounds of skim milk I remove as curd 2.59 pounds of protein having 0.18 pounds of ash contained therein which leaves 72.23 pounds of whey to which I add 5.75 pounds of the cream and the 15 pounds of milk. This mixture of approximately 92.98 pounds of material will then contain 2.52% fat, 1.13% protein, 4.63% lactose, 0.53% ash—8.81% total solids.

Now by concentrating this mixture by 1.40 times to 1 there would remain approximately $\frac{92.98}{1.40}$ or 66.41 pounds of material containing the following percentage of the various constituents: fat 3.52%, protein 1.58%, lactose 6.50%, ash 0.74%, total solids 12.34%. It is obvious that the proportions of the main constituents of this mixture closely approximate the proportions of the same ingredients found in mothers' milk and that they are identical to those theoretically desired.

To more clearly illustrate the above example the following tables may be useful:

|  | Fat | Protien | Lactose | Ash | Total solids |
|---|---|---|---|---|---|
| Lbs. solids retained in cream | 1.80 | 0.22 | 0.26 | 0.04 | 2.32 |
| Lbs. solids retained in whey |  | 0.26 | 3.38 | 0.35 | 3.99 |
| Lbs. solids retained in milk | 0.55 | 0.57 | 0.67 | 0.10 | 1.89 |
| Total solids retained | 2.35 | 1.05 | 4.31 | 0.49 | 8.20 |
| Percent of solids retained ($\frac{x}{92.98}$) | 2.52 | 1.13 | 4.63 | 0.53 | 8.81 |
| Percent after concentration (1.4 to 1) | 3.52 | 1.58 | 6.50 | .74 | 12.34 |

After concentrating to the extent of 1.40 to 1 I would have remaining approximately $\frac{92.98}{1.40}$ equal to 66.41 lbs. of material containing 3.52% fat, 1.58% protein, 6.50% lactose, 0.74% ash and 12.34% total solids as shown above.

However as cows' milk is a natural product which varies to a considerable extent in its composition it is obvious that no fixed figures could be taken as to the exact amount of milk to be skimmed from each 100 lbs. of milk used, nor could any fixed proportion of cream be taken as the amount to be retained. The proportions used depend entirely upon the analysis of the milk to be used. However knowing the analysis of the milk, the amount to be skimmed, the amount of protein to be removed, the amount of cream to be retained, and the ratio of concentration necessary to approximate the composition, average mothers' milk may be readily computed.

While I do not limit myself to the figures used in the above illustration they will serve to convey the principle involved; and since they are based on cows' milk of average composition they are fairly representative of the comparative amounts which I ordinarily use in practice.

I will now proceed to give in detail the novel process used in the manufacture of my substitute for mothers' milk:

Only cows' milk which has been produced from healthy cows under sanitary conditions and which has a relatively low bacterial count may be used.

This milk is first given a pasteurizing treatment, preferably by the holding method, as soon as convenient after its receipt at the factory. From the pasteurizer the milk is run through a cooler where a major portion of the same is cooled to approximately 85 degrees F. The exact amount taken for the major portion is determined by calculation based upon the percentage composition of the milk as heretofore explained.

Proper ratio of the component milk solids is obtained by removing the required amount of casein and returning such cream as may be necessary to supply the necessary butter fat. Practically no lactose is removed so it is only necessary to supply the other constituents in the proper ratio, relative to the percent of lactose, in order to obtain approximately the same ratio of the various constituents as that found in mothers' milk. A minor portion (the remainder) of the whole milk is further cooled to approximately 60 degrees F. or lower.

The major portion of the milk is next run through a cream separator where the cream is removed. As soon as skimmed the cream is cooled to approximately 60 degrees F. or lower.

The skimmed milk is then treated with rennin or other coagulating material. The resulting whey is drained from the casein or curd and the whey free curd is rejected. The whey is then boiled, filtered or strained through cheese cloth or other suitable material, and then cooled to 130 degrees F. or lower.

The minor portion of the whole milk together with such portion of the cream as may be necessary to give the proper percentage of butter fat are next added by stirring into the whey. This mixture consisting of the minor portion of the whole milk, cream and whey is then sterilized by heating to a minimum temperature of 200 degrees F. and holding the same at this temperature for a period of ten minutes.

As the various constituents of this mixture have already been brought to the proper ratio, relative to each other, it is now only necessary to concentrate the mixture by evaporation in a vacuum pan in order to obtain the same percentage composition as is found in average mothers' milk. If desired the concentration in the vacuum pan may be carried further preferably to a concentration which will give double the percentage of the various milk solids as are found in mothers' milk. If concentrated to the extent of 2 to 1 relative to the composition of mothers' milk it may be conveniently diluted for use to the same composition as mothers' milk by the addition of an equal volume of pure water (preferably water that has been boiled) to the concentrated product.

The operation within the vacuum pan during the evaporation is well known.

When evaporated to the desired extent the milk is removed from the vacuum pan and run through a homogenizing machine and from thence through a cooler where it is cooled to 60 degrees F. or lower as desired depending largely upon whether or not it is desired to can or bottle the product at once.

If desired for immediate consumption the product may be canned or bottled and then pasteurized after which it should be cooled. It is then ready to be marketed. If it is to be kept for an indefinite period of time it will be necessary to sterlize the same after it is sealed in the cans or bottles, by subjecting it to a temperature of 212 degrees F. or higher for a sufficient length of time to destroy all bacteria and their spores.

If desired the sterilizing may also be accomplished by the intermittent method in which method the canned or bottled milk product is heated to at least 212 degrees F. for a sufficient length of time to kill any vegetative bacteria. This heating is repeated on each of three succeeding days. Before giving the third heat treatment the spores present would all have developed into the vegetative state and hence would be killed. Therefore at the end of the third heat treatment all organisms would have been killed and the product would be sterile.

If desired the product may be further concentrated by evaporation, preferably to a concentration of two to one in terms of above approximate percentage. This would give a concentrated product of the following approximate composition: Fat 7.00%, protein 3.20%, lactose 13.00%, ash 1.40% and total solids 24.60%. The product from this concentration when diluted with an equal amount of water gives a resulting product of the approximate percentage composition of mothers' milk all the solid constituents of which have been obtained wholly from cows' milk. The proper percentage composition is made possible by the removal of the excess of certain constituents, as hereinbefore explained in detail and the subsequent evaporation of the remaining portion of the whole amount of milk to the proper concentration.

What I claim is:

The process of changing the relative values of the properties of bovine milk to produce a homogeneous product with such relative proportions of properties as to adapt the same for use as food for human infants, consisting in pasteurizing a volume of whole bovine milk, then dividing the volume of milk into major and minor quantities of approximately 85% and 15% proportions, respectively, then removing cream approximately to the amount of 10% of the whole from the major quantity of milk, and leaving approximately 75% of skimmed milk, then removing approximately 2.59% of protein and approximately 0.18% of ash from the skimmed milk, and leaving approximately 72.23% of whey, then adding the cream to the approximate amount of 5.75% of the whole and the said minor quantity of milk to the approximate amount of 15% of the whole to the whey and obtaining a mixture approximately equal to 92.98% of the original volume of whole milk and containing approximately 2.52% fat, 1.13% protein, 4.64% lactose, 0.53% ash and 8.81% solids, and finally concentrating the mixture to produce a homogeneous food product having values of approximately 3.52% fat, 1.58% protein, 6.50% lactose, 0.74% ash and 12.34% solids.

In witness whereof I hereunto subscribe my name this 28th day of June, A. D. 1923.

THEODORE C. MANCHESTER.